April 16, 1935.   C. VAN DER KUY   1,997,953
SPATULA
Filed May 7, 1934
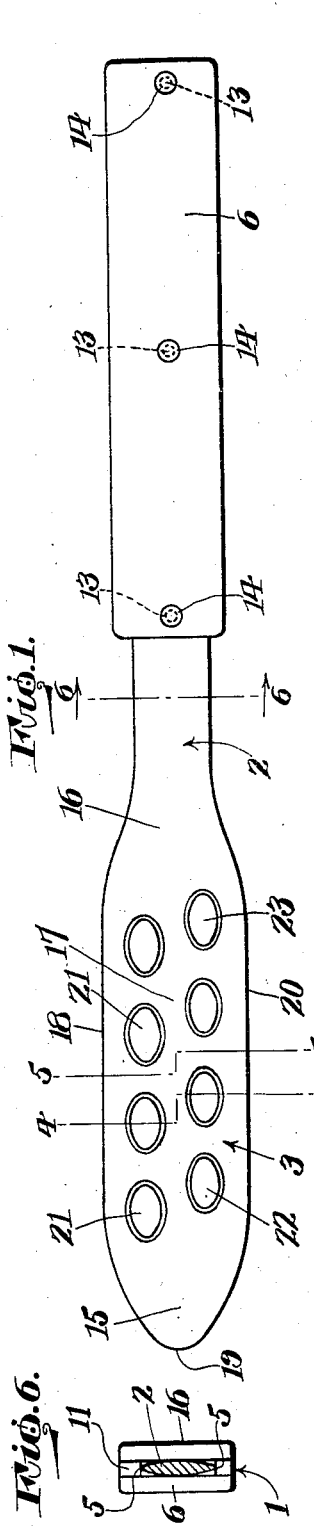
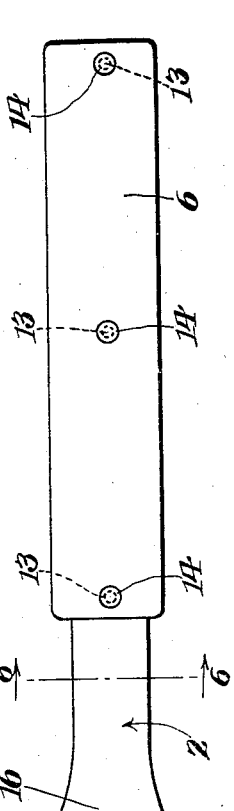
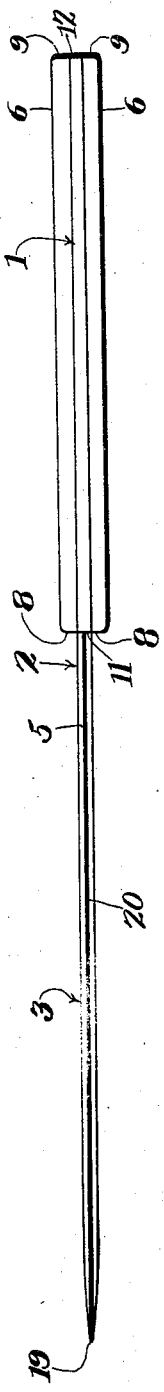
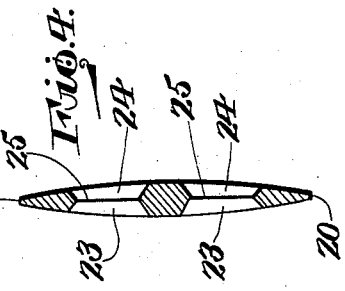
Inventor
Cornelius Van Der Kuy
By Geo. P. Kimmel
Attorney Patented Apr. 16, 1935

1,997,953

UNITED STATES PATENT OFFICE 1,997,953

SPATULA

Cornelius Van Der Kuy, Pontiac, Mich.

Application May 7, 1934, Serial No. 724,465

2 Claims. (Cl. 259—144)

This invention relates to a spatula for the mixing of plasters and investments in dentistry and in dental laboratories, and has for its object to provide, in a manner as hereinafter set forth, a tool of the class referred to whereby the spatulating operation carried out thereby will be had more quickly, easily and efficiently than that had by the form of spatula now in general use.

A further object of the invention is to provide, in a manner as hereinafter set forth, a spatula having a blade of substantially elliptical cross-section provided with means intermediate its ends for not only materially facilitating a spatulating operation, but also to provide for a thoroughly efficient and smooth mix.

A further object of the invention is to provide, in a manner as hereinafter set forth, a spatula of increased thickness and of reduced length with respect to the type now generally employed for the purpose of obtaining a more satisfactory action therefrom during and for expediting a spatulating operation.

Further objects of the invention are to provide, in a manner as hereinafter set forth, a tool of the class referred to which is simple in its construction and arrangement, strong, durable, compact, thoroughly efficient in its use, readily assembled, and inexpensive to manufacture.

To the above ends essentially, and to others which may hereinafter appear, the invention consists of such parts, and such combination of parts which fall within the scope of the invention as claimed:

In the drawing:—

Figure 1 is a top plan view of the spatula.

Figure 2 is a view looking towards one lengthwise edge thereof.

Figure 3 is a view looking towards the outer end edge of the blade.

Figure 4 is a section on line 4—4, Figure 1.

Figure 5 is a section on line 5—5, Figure 1, and

Figure 6 is a section on line 6—6 Figure 1.

The spatula includes a shank 1 which terminates at its outer end in the neck 2 of a blade 3. The shank, neck and blade are formed from a single length of metallic material. The shank is of greater width than the neck. The shank is of oblong contour and of materially greater length than the neck. The latter is of rectangular contour in plan. The shank is of rectangular cross section whereby its side edges 4 are squared. The neck 2 is of elliptical cross section to provide knife edges 5 at its sides. The shank is interposed between a pair of handle members 6, each corresponding in width and length to that of the shank. The members 6 may be formed of any suitable material and have squared side edges 7 and squared end edges 8, 9. The edges 7 of handle member 6 are flush with the side edges 4 of the shank. The edges 8, 9 of the members 6 are flush with the end edges 11, 12 of the shank. The latter and members 6 are formed with sets of aligning openings 13 through which extend holdfast means 14 for clamping the shank between said members in the position as shown in Figures 1, 2 and 6.

The blade 3 consists of an outer end stretch 15 of semi-oval contour in plan, an inner end stretch 16 of flared contour in plan and an intermediate stretch 17 of rectangular contour in plan. The stretch 17 is of greater length and of greater width throughout than that of the other stretches. Each of said stretches is of elliptical contour in transverse cross section. The faces of the stretch 16 curved towards each in a direction of the length of said stretch. The manner, as aforesaid of setting up the blade provides a knife or cutting edge at each of its sides and at its outer end. The knife edges are designated 18, 19 and 20. The edges 18 and 20 form flush continuations of the knife or cutting edges 5 of the neck 2. The stretch 15 merges at its inner end into the outer end of stretch 17 and it is imperforate. The stretch 16 merges at its outer end into the inner end of stretch 17 and it is imperforate. The stretch 17 is formed lengthwise thereof with two spaced rows of spaced openings. The openings in one row are designated 21 and those of the other row at 22. The openings 20 are staggered with respect to the openings 21. The wall of each opening 21 and each opening 22 is oppositely beveled, as at 23, 24 to provide a knife or cutting edge 25.

The blade, neck and shank are set up of a material of greater stiffness than that used in connection with the spatulas now generally employed. The blade 3 is of less length than the ordinary spatula blade. By the increased stiffness and shortness referred to it results in a far superior action during spatulating than that obtained by the readily pliable elongated tool now used. The openings 21, 22 materially expedite the step of spatulating as the materials forming the mix may readily pass through forth and back while spatulating. The various knife edges facilitate the passage of the blade through the materials being mixed. The form of spatula, in accordance with this invention will act to mix the materials easier, quicker and more satisfactory than the hand operated tools for such purpose now generally employed.

The stretch 15 constitutes a carrier for the purpose of transferring the mixed materials to the point desired. The form of the blade is such, that when the material has set hard thereon, it is readily removable by hitting an object by the blade, and the blow causes the material to break off clean from the blade.

What I claim is:—

1. In a spatula a flat shank, handle means secured therewith, a neck extended from the shank, a blade formed of a one piece body having a flared inner portion merging into said neck and an outer portion of semi-oval contour, said neck and blade having their side faces oppositely curved, said neck and the said blade being of elliptical contour in transverse section, said neck having its sides in the form of cutting edges, said blade being formed throughout with a cutting edge forming flush continuations of the cutting edges of the neck, and said blade being formed with a pair of spaced rows of spaced openings lengthwise thereof, said rows being spaced from the ends of the blade, each row being arranged between the longitudinal median and a side edge of the blade.

2. In a spatula a flat shank, handle means secured therewith, a neck extended from the shank, a blade formed of a one piece body having a flared inner portion merging into said neck and an outer portion of semi-oval contour, said neck and blade having their side faces oppositely curved, said neck and the said blade being of elliptical contour in transverse section, said neck having its sides in the form of cutting edges, and said blade being formed throughout with a cutting edge forming flush continuations of the cutting edges of the neck, said blade being formed with two spaced rows of spaced openings lengthwise thereof, each row being arranged between the longitudinal median and a side edge of the blade, one of said rows being extended forwardly from the other of said rows, the openings of said rows being disposed in staggered relation, and said handle means having said shank interposed therein and flush with the side and end edges of the shank.

CORNELIUS VAN DER KUY.